Oct. 16, 1928.
W. P. BULLARD
1,688,263
FEEDING MEANS FOR GRADING APPARATUS
Filed March 27, 1924    2 Sheets-Sheet 1
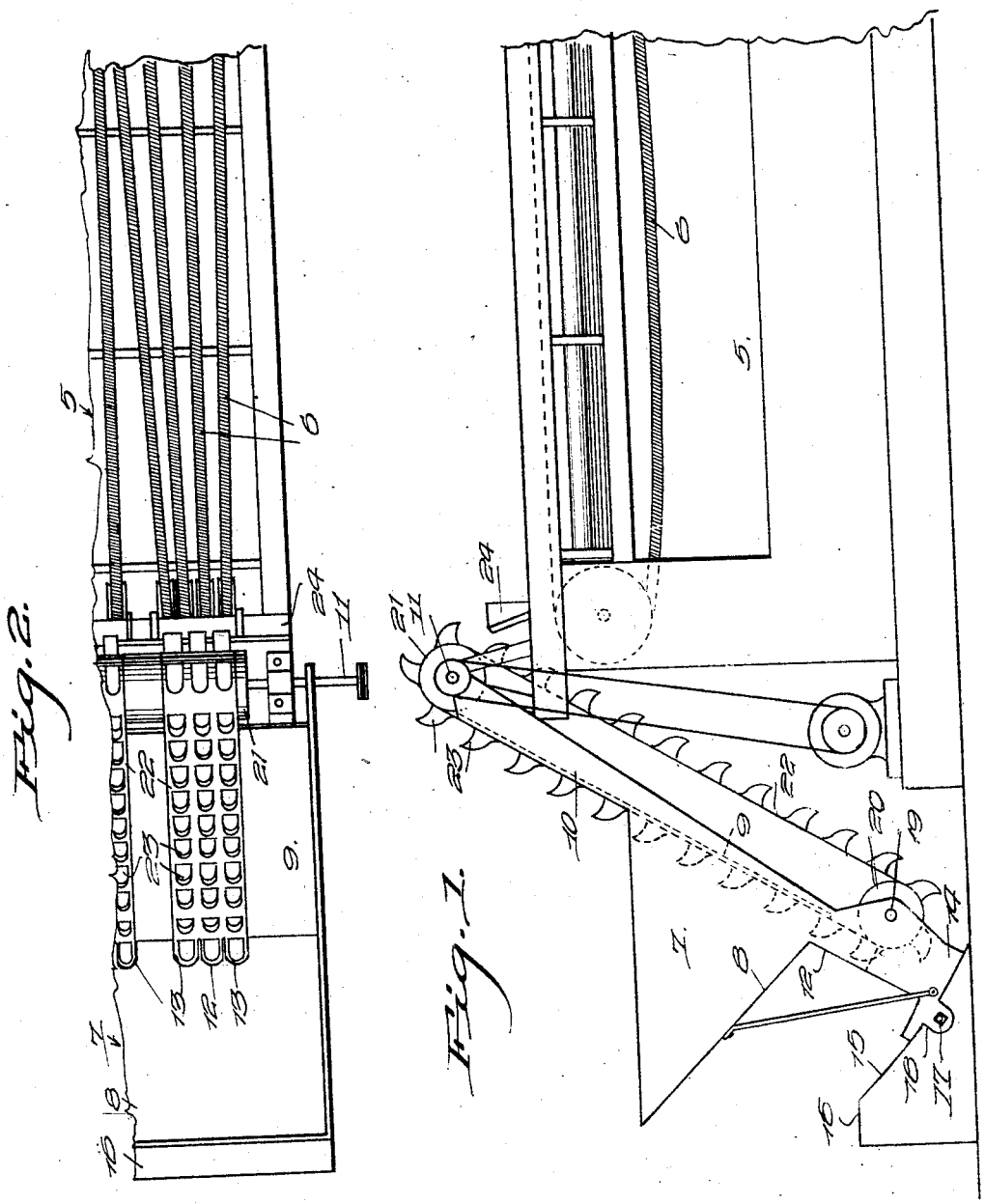
Inventor
William P. Bullard
By
Attorney

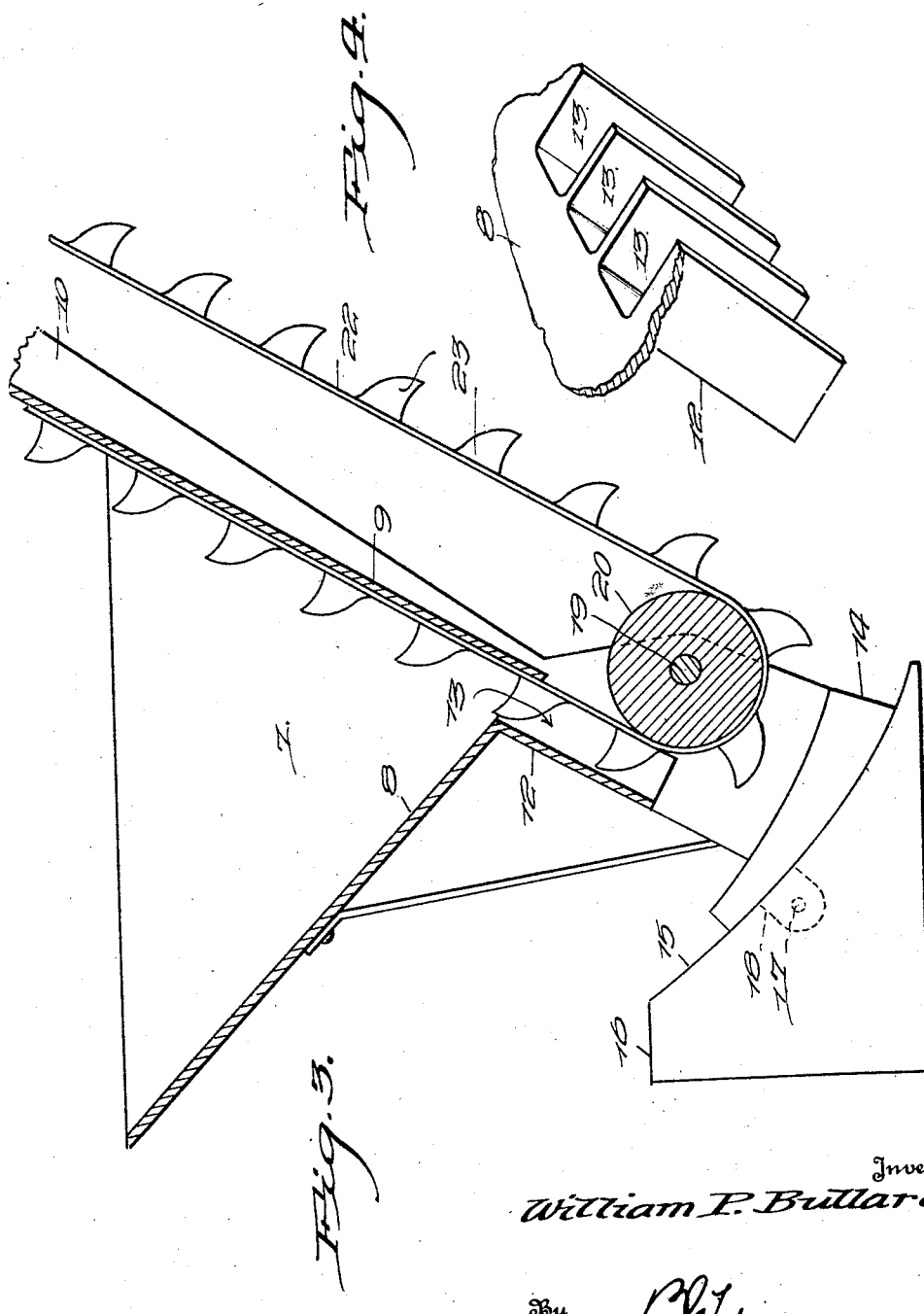

Patented Oct. 16, 1928.

1,688,263

UNITED STATES PATENT OFFICE.

WILLIAM P. BULLARD, OF ALBANY, GEORGIA.

FEEDING MEANS FOR GRADING APPARATUS.

Application filed March 27, 1924. Serial No. 702,396.

The present invention relates to feeding apparatus for grading machines, and while particularly intended for feeding nuts, it is of course not restricted to such use.

In the accompanying drawings:—

Figure 1 is a side elevation of a portion of a grader and the novel feeding means therefor.

Figure 2 is a plan view,

Figure 3 is a vertical sectional view on an enlarged scale, through the hopper,

Figure 4 is a perspective view of a set of the channels or throats.

In the embodiment disclosed the grading mechanism is designated generally by the reference numeral 5, and as shown includes sets of divergently disposed endless carriers in the form of belts 6, on which the nuts or other articles are deposited. These nuts are carried by the belts until the space between said belts is sufficient to permit them to pass therethrough.

The present invention relates more particularly to the means for delivering the nuts on to the said belts.

As shown, a hopper 7 is provided, having a front rearwardly inclined wall 8 and an upwardly extending inclined wall 9. This hopper may be swung by arms 10 on a shaft 11 that is journaled on the receiving end of the grader. The lower end of the front wall 8 of the hopper 7 carries depending channel members 12 in which are formed throats 13, one for each set of grading belts 6. A foot piece 14, constituting an extension of the channel members 12, has a sliding bearing on the grooved surface 15 of a base 16. This foot piece may be held in different positions by any suitable means, as for example, set screws 17 which pass through ears 18 on said foot piece and engage the opposite sides of the base 16.

Journaled in the foot piece 14 is a shaft 19 carrying pulleys 20. The upper shaft 11 is also provided with pulleys 21. Passing around these pulleys are endless carrier belts 22 of any suitable character, having their upper stretches moving upwardly over the rear wall 9 of the hopper, and constituting closures for the rear open sides of the throats 13, as will be clear by reference to Figure 3. These belts are provided with nut or article-holding cups 23. The distance between the cups 23, as shown in Figure 3, is less than the length of the throats 13, so that one of these cups is always in each of the throats, and consequently nuts or other articles placed in the hopper cannot pass through and escape from the lower ends of the throats.

The operation of the structure is as follows: If nuts, for example, pecans, are placed in the hopper 7, and the belts are caused to be operated, these nuts will be carried upwardly by the cups moving upwardly through the throats 13 and the rear side of the hopper, and moving over the pulleys 21, will be discharged upon the coacting belts 6, suitable boards 24 being preferably employed to insure the nuts being deposited on the said belts. As the belts move away from the receiving end of the grader, they will carry the nuts with them until said nuts can pass between the belts. It has been found, especially with pecan nuts, that where the nuts are small the feeding operation is better effected when the belt is more nearly vertical and that the larger nuts are more effectively carried when the feeding stretches of the belts are at a less inclination. By adjusting the position of the hopper, this change of inclination of the feeding stretch of the belt can be easily accomplished, making the apparatus easily adjustable for nuts or other articles of different sizes.

Nuts and particularly pecan nuts are of many different shapes and sizes—large, small, round, long and slender; some are stubby or round ended while others are sharp pointed. These different characteristics of pecan nuts render them easily apt to become clogged and jammed in the hopper or the sharp points are likely to become stuck and wedged in the moving machinery, thus crushing the nuts or perhaps stopping the machines entirely.

This makes it a practical impossibility to feed pecan nuts out of a hopper by gravity and deposit them on grading rolls or ropes or other grading machinery with that regularity and certainty as to secure an even and sufficiently continuous flow to accomplish both accuracy of grades and necessary production; either the nuts will bridge and the feed be so slow that production or output will be low; or else the feed will be so rapid that the grading machine will not carry the nuts away in orderly fashion but they will be piled on top of each other and small nuts carried beyond their destination to a wider opening and accuracy in grades destroyed.

Therefore the attainment of what might be called a universal hopper is necessary to the proper and necessarily rapid grading of pecan nuts and this result is attained by the construction of a throat or channel as herein explained, with the close fitting cups which will not permit the sharpest pointed nuts to stick or jam or either become crushed or stop the machinery.

An adjustable hopper is accomplished by moving the foot of the hopper in or out, permitting the proper quantity of nuts always to be carried upward and deposited on the grading ropes or rolls in an orderly and dependable fashion. If nuts are small and too many are apt to be carried upward then the bottom of the hopper is moved to a more perpendicular position. Likewise if nuts are large and fewer stick on the cups then the hopper is easily and quickly moved to a more slanting position.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

1. In apparatus of the character set forth, means for feeding nuts comprising a holding hopper, an inclined upwardly moving conveyor extending upwardly from the hopper and having its upper delivery end permanently positioned to deliver to nut receiving mechanism, said hopper and the lower end of the conveyor being both adjustable to different positions with relation to the delivery end, to vary the inclination of the conveyor.

2. In apparatus of the character set forth, a nut holding hopper at the receiving end of receiving mechanism having depending nut receiving channels and a rearwardly inclined back wall, an endless feed belt having an upwardly moving stretch that operates over said back wall, nut carrying cups on the belt that pass upwardly through the channels and over the back wall of the hopper, said hopper and belt having a pivot mounting at the upper end of the belt at the receiving end of the mechanism and capable of swinging together to different positions to place the said stretch of the belt at different inclinations and cause the cups to retain the nuts therein while maintaining the delivering end in fixed relation, and means for securing said hopper in different positions.

3. In apparatus of the character set forth, the combination with a hopper having a back wall and a depending nut receiving channel with a front wall and an open back, a belt having an upwardly moving stretch that constitutes the rear wall of the channel and is spaced from the front wall thereof, said stretch operating over the inner face of the hopper's rear wall, and article carrying devices on the belt moving upwardly through the channel and the hopper.

In testimony whereof, I affix my signature.

WILLIAM P. BULLARD.